(12) United States Patent
McFarland

(10) Patent No.: US 9,702,476 B2
(45) Date of Patent: Jul. 11, 2017

(54) SEALED ARMATURE BALL TUBE ASSEMBLY

(71) Applicant: Robert Wayne McFarland, Newport News, VA (US)

(72) Inventor: Robert Wayne McFarland, Newport News, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/087,302

(22) Filed: Mar. 31, 2016

(65) Prior Publication Data

US 2016/0208950 A1 Jul. 21, 2016

Related U.S. Application Data

(63) Continuation of application No. 13/588,514, filed on Aug. 17, 2012, now Pat. No. 9,366,355.

(51) Int. Cl.
| | | |
|---|---|---|
| *B05B 1/30* | (2006.01) | |
| *F16K 31/06* | (2006.01) | |
| *F02M 61/18* | (2006.01) | |

(52) U.S. Cl.
CPC ....... *F16K 31/0651* (2013.01); *F02M 61/188* (2013.01); *F16K 31/0662* (2013.01); *F02M 2200/8084* (2013.01)

(58) Field of Classification Search
CPC ............ F16K 31/0651; F16K 31/0662; F02M 61/188; F02M 2200/8084; F02M 63/0265; F02M 2200/28; F02M 47/027; F02M 61/205; F02M 63/0225; F02M 35/10216; F02M 55/005; F02M 55/02; F02M 55/025; F02M 61/14; F02M 69/462; F02M 69/465; F02D 2250/04; F02D 2250/31; F02D 41/3809; F02D 41/3836; F02D 41/3845; F02D 41/3863
USPC ......... 239/533.1, 533.2, 533.3, 533.4, 533.7, 239/533.9, 569, 584, 585.1, 585.4, 585.5; 123/299, 446, 447, 467, 468
See application file for complete search history.

(56) References Cited

U.S. PATENT DOCUMENTS

| | | | | |
|---|---|---|---|---|
| 3,865,312 A | * | 2/1975 | Lombard | ............. F02M 51/005 239/585.1 |
| 4,427,156 A | * | 1/1984 | Bouthors | ........... F02M 51/0632 239/488 |
| 4,427,456 A | | 1/1984 | Bouthors et al. | |

(Continued)

OTHER PUBLICATIONS

English Translation of State Intellectual Property Office, P.R. China First Office Action dated May 22, 2015.

*Primary Examiner* — Justin Jonaitis

(57) ABSTRACT

An injector having a tube attached to an armature. The injector includes a solenoid portion and a valve portion controlled by the solenoid portion. The armature includes a small diameter portion. Also included is a tube having a cavity, a first end of the tube is connected to the small diameter portion, and a ball is connected to a second end of the tube, such that the ball is selectively in contact with a valve seat. A hermetic weld connects the ball to the second end, and at least one heat affected zone is located in proximity to the hermetic weld. A coating substantially surrounds the heat affected zone and at least a portion of the ball, such that the coating prevents the heat affected zone from being exposed to diesel exhaust fluid and thus subsequent corrosion.

18 Claims, 2 Drawing Sheets

(56) References Cited

U.S. PATENT DOCUMENTS

| | | | | |
|---|---|---|---|---|
| 5,190,223 | A | * | 3/1993 | Mesenich ............ F02M 51/005 |
| | | | | 239/585.5 |
| 6,508,416 | B1 | * | 1/2003 | Mastro ............... F02M 51/0639 |
| | | | | 239/533.2 |
| 9,366,355 | B2 | * | 6/2016 | McFarland ......... F16K 31/0662 |
| 2002/0047054 | A1 | * | 4/2002 | Dallmeyer ........... F02M 51/005 |
| | | | | 239/585.1 |

* cited by examiner

SEALED ARMATURE BALL TUBE ASSEMBLY

CROSS REFERENCE TO RELATED APPLICATION

This U.S. patent application is a continuation application and claims the benefit of U.S. patent application Ser. No. 13/588,514, filed Aug. 17, 2012, and issued as U.S. Pat. No. 9,366,355, the content which is hereby incorporated by reference herein in its entirety.

FIELD OF THE INVENTION

The invention relates generally to injectors, and more specifically, a treated valve which reduces corrosion due to exposure to diesel exhaust fluid (DEF) and condensed diesel exhaust system gases.

BACKGROUND OF THE INVENTION

Injectors are a commonly used device for injecting fuel into the cylinders of an internal combustion engine, as well as injecting diesel exhaust fluid (DEF) into the exhaust flow path, more particularly the exhaust pipe. While DEF alone is not corrosive, DEF has the capacity to support a corrosion reaction due to its conductivity. DEF and condensed diesel exhaust system gases support electrochemical corrosion of stainless steel components within the injector.

Some types of injectors have a ball which is part of a valve, and the ball selectively contacts a valve seat, depending upon whether or not the valve is opened or closed. The injector may include a solenoid portion which actuates the valve. Various parts of the injector are exposed to DEF during operation, such as the ball, and the component used to connect the ball to the solenoid portion. The ball is typically welded to the component which connects the ball to the solenoid portion, and the movement of the solenoid portion controls the movement of the ball. The ball is selectively in contact with the valve seat to change the valve between an open position and a closed position.

In an injector application, it is desirable to have a hard ball to maximize durability. In most cases, hardened 440C stainless steel is used because it is hard, corrosion resistant, and weldable. It is known that welding hardened 440C creates an area known as the heat affected zone (HAZ). In this area, the corrosion resistance is reduced due to migration of the protective chromium to carbon. When this chromium migration occurs, the exposed surface has a dearth of chromium which is the key ingredient in corrosion protection. Materials with low carbon are not affected in this manner, but carbon is the ingredient within steel which provides the desired hardening capability of 440C.

The use of steel balls with 440C hardness is employed extensively for gasoline injectors without corroding, but when used with DEF, corrosion in the HAZ is likely. Several attempts have been made to minimize the corrosion problem by coating the ball with thin protective coatings. The ball does not always get full coverage using this method because the entire area of the ball is not exposed to the carbon during the coating process. Corrosion protection in this instance is therefore unpredictable.

Accordingly, there exists a need for an injector having a ball welded to a tube which is corrosion resistant to DEF and condensed diesel exhaust system gases. More particularly, there is also a need for a ball and tube assembly used as part of a solenoid injector which resists or at least reduces corrosion from DEF and condensed diesel exhaust system gases.

SUMMARY OF THE INVENTION

One embodiment the present invention is an injector having a tube attached to an armature. The injector includes a solenoid portion and a valve portion controlled by the solenoid portion. The armature includes a small diameter portion. Also included is a tube having a cavity, a first end of the tube is connected to the small diameter portion, and a ball is connected to a second end of the tube, such that the ball is selectively in contact with a valve seat. A weld connects the ball to the second end, and at least one heat affected zone is located in proximity to the weld. A coating substantially surrounds the heat affected zone and at least a portion of the ball, such that the coating prevents the heat affected zone from being exposed to diesel exhaust fluid.

In an embodiment, a lower wall portion is formed as part of the tube, the lower wall portion in contact with at least part of the ball such that the lower wall portion substantially matches at least a portion of the shape of the ball. A plurality of exit apertures are formed as part of the tube which allow diesel exhaust fluid to flow through the cavity and exit the tube, and then pass around the portion of the ball surrounded by the coating. The diesel exhaust fluid passes through the armature, the cavity of the tube, and out of the plurality of exit apertures, around the ball, and through the valve seat.

In this design, the top of the ball is sealed from any exposure, mitigating the possibility of any corrosion due to complete elimination of the aqueous environment. Corrosion protection with this invention is assured.

In another embodiment, a plurality of upper exit apertures are formed as part of the armature. The diesel exhaust fluid passes through the upper exit apertures, around the outside of the tube, and around the first valve member and through the second valve member, exiting the valve portion. In this embodiment, a solid connection may be used between the armature and the ball. One advantage of this method is less cost and inherent centering ability of a tube, and assured protection. Using a closed tube or sealed tube, the top of the ball is no longer exposed to the aqueous environment. Another benefit of the sealed tube method is that there is less fluid volume in the injector and less volume of stagnant fluid. It is known that stagnant fluid is detrimental to corrosion resistance.

In the latter case, the armature must redirect fluid flow to the outside of the armature tube via angled or perpendicular holes. A protective coating is then applied for positive corrosion resistance in the remaining heat affected zone. The tube that is attached to the ball is austenitic steel that has far greater corrosion resistance than 440C when welded due to high chromium and low carbon. An austenitic steel ball would solve the corrosion problem, but would not be hard enough to survive the continued impact with the seat.

Of the closed end or sealed tube, the sealed tube has the secondary benefit of minimizing stagnant fluid areas, reduces the surface area exposed to DEF, and reduces the moving mass (by replacing liquid with air). Additionally, with less interior volume, less fluid needs to be purged when used on a purge style SCR system. From a manufacturing standpoint, the sealed tube offers advantages during the welding operation. The ball is held in position by the use of vacuum. With closed end tube, the ball must remain in position with either an additional arm, or gravity.

In other embodiment a solid pin with a spherical radius may be used, instead of the ball. In another embodiment, a drop of epoxy could be placed on the ball within the tube to form a barrier to DEF. In yet another embodiment, a plug could be welded hermetically within the tube to keep the area within the tube dry.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
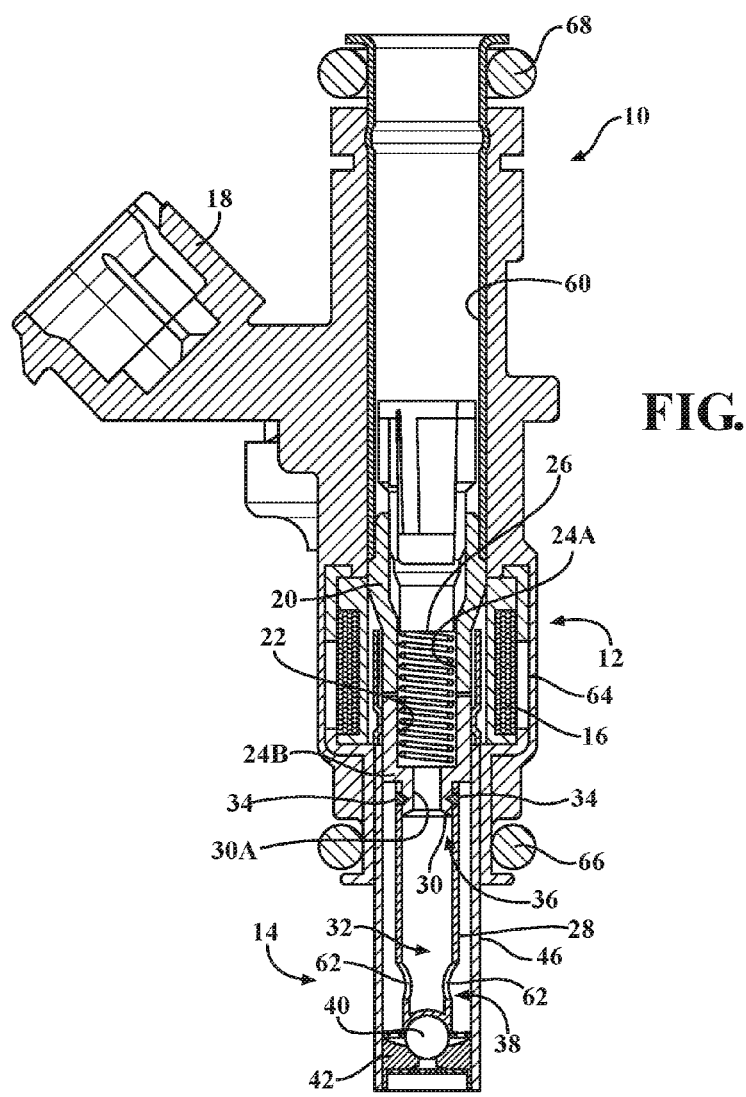
FIG. 1 is a sectional side view of an injector having a sealed armature ball tube assembly, according to embodiments of the present invention.

The following description of the preferred embodiment(s) is merely exemplary in nature and is in no way intended to limit the invention, its application, or uses.

A fuel injector according to embodiments of the present invention is shown generally at 10. The injector 10 includes a solenoid portion, shown generally at 12, and a valve portion, shown generally at 14. The solenoid portion 12 includes a solenoid having a coil 16 which is in electrical communication with a connector 18. The coil 16 at least partially surrounds a pole piece 20, and also at least partially surrounds an armature 22. The armature 22 is moveable relative to the pole piece 20, and both the pole piece 20 and armature 22 each have a cavity 24A and 24B respectively. Partially disposed in each of the cavities 24A,24B is a spring 26, which biases the armature 22 away from the pole piece 20, and the valve portion 14 toward a closed position.

The valve portion 14 includes a tube 28 connected to the armature 22, as shown in FIG. 1, which connects the solenoid portion 12 to the valve portion 14. The armature 22 includes a small diameter portion 30 which extends into a cavity, shown generally at 32, of the tube 28. The small diameter portion 30 of the armature 22 includes an aperture 30A, which allows diesel exhaust fluid to pass through the armature 22. A first end, shown generally at 36, of the tube 28 is connected to the small diameter portion 30 through the use of a weld 34, as shown in FIG. 1. A second end, shown generally at 38, in this embodiment is a closed end and includes a first valve member, which in this embodiment is a ball 40. The ball 40 selectively contacts a second valve member, which in this embodiment is a valve seat 42. The ball 40 is also connected to the end 38 of the tube 28 by a hermetic weld 44. The cavity 32 of the tube 28 is located between the ball 40 and the armature 22.

Figure 2:
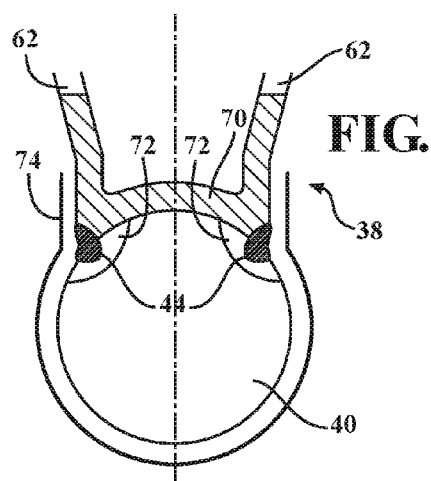
FIG. 2 is an enlarged sectional view of a ball connected to a tube, which is part of a sealed armature ball tube assembly, according to embodiments of the present invention.

The valve portion 14 also includes a valve body 46 which is also connected to the solenoid portion 12, best seen in FIG. 1. Disposed within the valve body 46 is the valve seat 42, mounted in the lower end of the valve body 46, as shown in FIG. 2. Movement of the ball 40 is controlled by a guide 50. The guide 50 includes a guide aperture 52 through which the ball 40 moves, and also includes side apertures 54 which the fluid flows through. The valve seat 42 includes a conical-shaped portion 56, upon which the ball 40 rests when the valve is in the closed position. The valve seat 42 also includes a central aperture 58, through which the fluid passes as the fluid exits the injector 10. Surrounding part of the pole piece 20 is an upper valve body 60, which is able to receive fluid.

During the operation of the injector 10, the valve, and more specifically the tube 28 and the ball 40, are biased by the return spring 26 to contact the valve seat 42, and therefore keep the valve in a closed position. When the coil 16 is energized, the armature 22 is drawn toward the pole piece 20. The energizing of the coil 16 generates enough force that the movement of the armature 22 overcomes the force of the return spring 26, and moves towards the pole piece 20. Because the tube 28 is connected to the armature 22, and the ball 40 is connected to the tube 28, the movement of the armature 22 towards the pole piece 20 moves the ball 40 away from the valve seat 42, opening the valve. When the valve is in an open position, the fluid flows from the upper valve body 60, through the cavity 24A of the pole piece 20, armature 22 (more specifically, the cavity 24B, and the aperture 30A of small diameter portion 30), through the inside of the tube 28 and out of a plurality of exit apertures 62 formed as part of the tube 28. After the fluid flows out of the exit apertures 62, the fluid passes through the side apertures 54, and out the central aperture 58. A portion of the fluid may also pass around the ball 40 and through the guide aperture 52, depending upon the location of the ball 40.

When the coil 16 is no longer energized, the return spring 26 forces the armature 22 away from the pole piece 20, and moves the armature 22, the tube 28 and the ball 40 such that the ball 40 is placed against the conical-shaped portion 56 of the valve seat 42, placing the valve in the closed position. The solenoid portion 12 also includes a casing 64 which at least partially surrounds the coil 16 and the lower valve body 46. Surrounding part of the casing 64 is a seal, which in this embodiment is an o-ring 66. There is a corresponding seal, which is this embodiment is a second o-ring 68. Both o-rings 64,66 function to seal the injector 10 and ensure the fluid is directed through the injector 10 properly.

In the embodiment shown in FIGS. 1 and 2, the ball 40 is attached to the second end 38 by use of the hermetic weld 44, as mentioned above. The second end 38 of the tube 28 has a lower wall portion 70, which substantially matches the contour of the surface of the ball 40.

During the creation of the weld 44, there are several zones which are affected by the heat which occurs during the welding process. These zones are referred to as heat affected zones 72. To prevent corrosion of the ball 40 in the area of the weld 44, the ball 40 includes a coating 74, which prevents corrosion of the ball 40. More specifically, the coating covers the exposed heat affected zones 72, preventing corrosion which may result from the chromium migration during the welding process to create the weld 44.

In operation, the solenoid portion 12 is used for actuating the valve portion 14 between an open position, and a closed position. When the valve portion 14 is in the open position, the ball 40 is moved away from the valve seat 42, as mentioned above. The fluid flow out of the tube 28 flows out of the exit apertures 62, and around the ball 40. The DEF does not come in contact with the heat affected zones 72 because of the coating 74.

Figure 5:
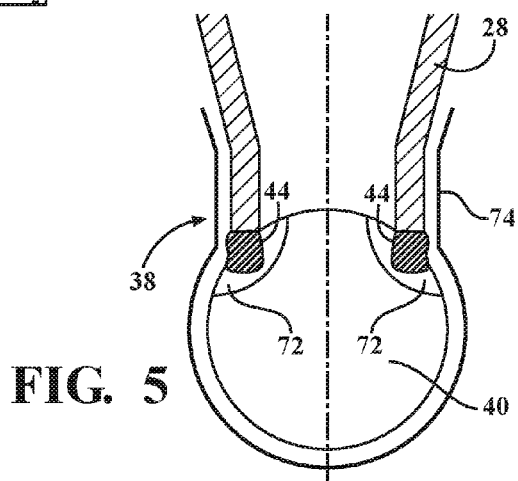
FIG. 5 is an enlarged sectional side view of a ball connected to a tube, which is part of a sealed armature ball tube assembly, according to embodiments of the present invention.
Figure 3:
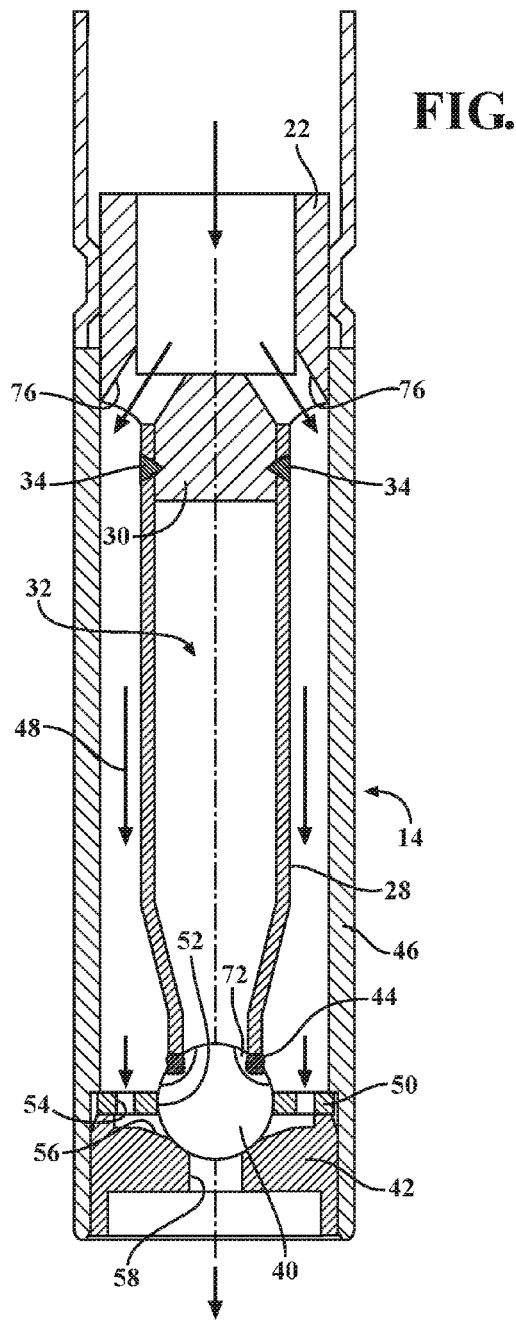
FIG. 3 is an enlarged sectional side view of a portion of an injector having a sealed armature ball tube assembly, according to embodiments of the present invention.
Figure 4:
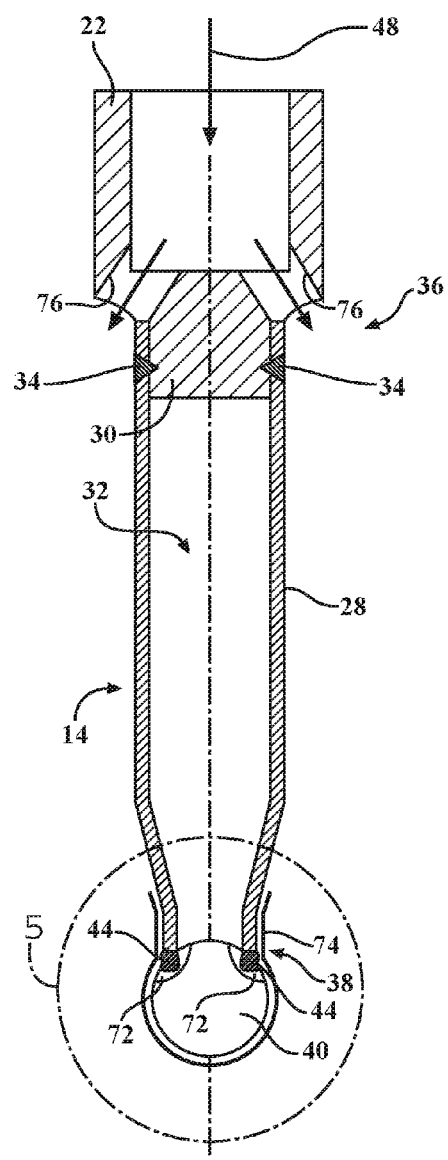
FIG. 4 is an enlarged sectional side view of an armature connected to a tube having a ball, which is part of a sealed armature ball tube assembly, according to embodiments of the present invention.

An alternate embodiment of the invention is shown in FIGS. 3-5, with like numbers referring to like elements. In this embodiment, the tube 28 is an open tube 28 and the second end 38 is an open end, where the second end 38 does not have the lower wall portion 70, but the ball 40 is still connected to the second end 38 through the use of the hermetic weld 44, and also includes the coating 74. This embodiment also differs from previous embodiments in that the tube 28 does not have exit apertures 62, but rather there is a plurality of upper exit apertures 76 formed as part of the armature 22. In the embodiment shown in FIGS. 3-5, the weld 34 connecting the small diameter portion 30 of the armature 22 to the tube 28 is a hermetic weld 34. The small diameter portion 30 of the armature 22 is solid in this embodiment, and does not have the aperture 30A, and therefore the diesel exhaust fluid does not pass through the armature 22, as in the previous embodiment, but rather flows out of the upper exit apertures 76 and around the outside of the tube 28. The hermetic weld 34 in this embodiment prevents fluid from leaking into the tube 28 during operation. The diesel exhaust fluid then flows through the side apertures 54, and out the central aperture 58, when the valve is in an open position. The flow path of the diesel exhaust fluid is shown by the arrows 48.

The coating 74 protects the heat affected zones 72 from exposure to the diesel exhaust fluid. However, in the embodiment shown in FIGS. 3-5, there is no lower wall portion 70. The lower wall portion 70 is not necessary to protect the ball 40 (or the heat affected zones 72 exposed to the inside of the tube 28) because the diesel exhaust fluid flows around the outside of the tube 28. Since the flow of diesel exhaust fluid is on the outside of the tube 28, the coating 74 protects the areas of the heat affected zones 72 exposed to an area outside of the tube 28 from exposure to the diesel exhaust fluid.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a valve assembly, including:
   a valve operable for changing between an open position and a closed position;
   a tube;
   a first valve member connected to an end of the tube;
   a second valve member, the first valve member selectively in contact with the second valve member, the first and second valve members being at least part of the valve;
   at least one heat affected zone located on a portion of the first valve member, the tube and the first valve member cooperating to prevent fluid from contacting the heat affected zone through the end of the tube;
   a hermetic weld connecting the first valve member to the tube, wherein the heat affected zone surrounds the hermetic weld, the heat affected zone being created by the hermetic weld, and
   a coating at least partially surrounding the first valve member such that the coating covers a first portion of the heat affected zone, the coating protecting the portion of the first valve member having the first portion of the heat affected zone from corrosion, wherein
   the tube includes a lower wall portion formed as part of the tube at a distal end of the tube, the lower wall portion having an outwardly facing concave surface with a contour that matches a contour of at least a portion of an outer surface of the first valve member such that the at least a portion of the outer surface of the first valve member is received in the concave surface of the lower wall portion, the hermetic weld connecting the lower wall portion and the first valve member along an interface between the outwardly facing concave surface of the lower wall portion and the first valve member, the lower wall portion sealing the distal end of the tube so as to prevent fluid in the tube from contacting an upper portion of the first valve member and a second portion of the heat affected zone covered by the outwardly facing concave surface of the lower wall portion and not covered by the coating; and
   the tube further includes a plurality of exit apertures so as to define a fluid flow path of the valve assembly which passes through an internal cavity defined by the tube, exits the tube through the exit apertures, passes around the first valve member and exits the valve assembly between a space between the first valve member and the second valve member.

2. The apparatus of claim 1, further comprising:
   an injector body;
   a solenoid portion connected to the tube, the solenoid portion being part of the injector body; and
   a valve portion connected to the tube and the solenoid portion, the valve portion being part of the injector body and controlled by the solenoid portion;
   wherein the first valve member is part of the valve portion, and the second valve member is part of the valve portion.

3. The apparatus of claim 1, further comprising:
   an armature having a small diameter portion, a first end of the tube connected to the small diameter portion; and
   a cavity formed as part of the tube;
   wherein the cavity is located between the armature and the first valve member.

4. The apparatus of claim 3, further comprising a plurality of upper exit apertures formed as part of the armature, wherein the fluid flow path also passes through the upper exit apertures, around the outside of the tube, and around the first valve member and through the second valve member, exiting the valve assembly.

5. The apparatus of claim 1, wherein the first valve member is a ball and the outwardly facing concave surface of the lower wall portion of the tube comprises an outwardly facing, semi-spherical concave surface.

6. The apparatus of claim 1, wherein the second valve member is a valve seat.

7. A fluid injector comprising:
   an armature;
   a tube connected to the armature;
   a ball connected to an end of the tube with a weld connection;
   a valve seat, the ball selectively in contact with the valve seat;

at least one heat affected zone located on a portion of the ball in proximity to the weld connection, the at least one heat affected zone created by the weld connection, the tube and the ball cooperating to prevent fluid from contacting, through the end of the tube, a first portion of the heat affected zone that is covered by the end of the tube; and a coating at least partially surrounding the ball such that the coating covers a second portion of the heat affected zone that is not covered by the end of the tube, the coating protecting the portion of the ball having the second portion of the heat affected zone that is not covered by the end of the tube from corrosion;

wherein the ball is movable toward and away from the valve seat through the use of the tube and the armature.

8. The fluid injector of claim 7, further comprising:
a solenoid portion having the armature, the solenoid portion being part of the injector; and
a valve portion controlled by the solenoid portion, the valve portion being part of the injector, the ball and the valve seat being part of the valve portion;
wherein the tube is connected to the solenoid portion and the valve portion.

9. The fluid injector of claim 7, further comprising:
a lower wall portion formed as part of the tube on the end of the tube, the lower wall portion including an outwardly facing concave surface that receives and is in contact with at least part of the ball, such that the outwardly facing concave surface of the lower wall portion has a contour which matches a contour of the at least part of the ball;
a cavity formed as part of the tube, the lower wall portion being disposed between the cavity and the ball; and
a plurality of exit apertures formed as part of the tube such that a fluid flow path is defined through the fluid injector which includes entering the tube, exiting the tube through the exit apertures thereof and passing around the portion of the ball surrounded by the coating.

10. The fluid injector of claim 8, further comprising a plurality of upper exit apertures formed as part of the armature, wherein a fluid flow path is defined by the armature, the tube, the ball and the valve seat, the fluid flow path passes through the upper exit apertures, around the outside of the tube, around the ball, through the valve seat, and exits the valve portion without passing through the tube.

11. The fluid injector of claim 7, wherein the weld connection comprises a hermetic weld.

12. A fluid injector, comprising:
a solenoid portion;
a valve portion controlled by the solenoid portion;
an armature having a small diameter portion;
a tube having a cavity, and a first end of the tube connected to the small diameter portion;
a valve seat;
a ball connected to a second end of the tube, the ball selectively in contact with the valve seat;
a hermetic weld connection connecting the ball to the second end of the tube; and
at least one heat affected zone created by the hermetic weld connection and located in proximity to the hermetic weld connection, the tube and the ball cooperating to prevent fluid from contacting, through the second end of the tube, a portion of the heat affected zone that is covered by the second end of the tube.

13. The fluid injector of claim 12, further comprising:
a lower wall portion formed as part of and sealing the tube on the second end of the tube, the lower wall portion in contact with at least part of the ball, the lower wall portion having an outwardly facing concave surface such that a contour of the outwardly facing concave surface of the lower wall portion matches a contour of at least a portion of the ball so that the at least a portion of the ball is received within the outwardly facing concave surface of the lower wall portion, the portion of the at least one heat affected zone that is covered by the second end of the tube is covered by the lower wall portion thereof and is sealed from fluid passing through the fluid injector;
a cavity formed as part of the tube, the lower wall portion being disposed between the cavity and the ball; and
a plurality of exit apertures formed as part of the tube such that a fluid flow path is defined by the fluid injector to exit the tube and pass around the ball;
wherein the fluid flow path passes through the armature, the cavity of the tube, the plurality of exit apertures of the tube, around the ball, and through the valve seat.

14. The fluid injector of claim 12, further comprising a plurality of upper exit apertures formed as part of the armature, wherein a fluid flow path is defined by the fluid injector which passes through the upper exit apertures, around the outside of the tube, and around the first valve member and through the second valve member, exiting the valve portion, without passing through the tube such that the hermetic weld connection and the tube seals the portion of the at least one heat affected zone that is covered by the second end of the tube from fluid in the fluid injector following the fluid flow path.

15. An apparatus, comprising:
a valve assembly, including:
a valve operable for changing between an open position and a closed position;
a tube;
a first valve member connected to an end of the tube, the first valve member welded to the tube along a hermetic weld connection;
a second valve member, the first valve member selectively in contact with the second valve member, the first valve member and the second valve member being part of the valve;
at least one heat affected zone located on a portion of the first valve member surrounding the weld connection, the at least one heat affected zone created from the weld connection; and
a coating at least partially surrounding the first valve member such that the coating covers a first portion of the heat affected zone, the coating protecting the first valve member from corrosion,
wherein the tube, the first valve member and the hermetic weld connection are configured so as to cover and protect from corrosion a second portion of the heat affected zone that is not covered by the coating.

16. The apparatus of claim 15, wherein the valve assembly further comprises:
an injector body;
a solenoid portion connected to the tube, the solenoid portion being part of the injector body; and
a valve portion connected to the tube and the solenoid portion, the valve portion being part of the injector body and controlled by the solenoid portion;

wherein the first valve member is part of the valve portion, and the second valve member is part of the valve portion.

17. The apparatus of claim 16, wherein the valve assembly further comprises:
   an armature having a small diameter portion, a first end of the tube connected to the small diameter portion; and
   a cavity formed as part of the tube;
   wherein the cavity is located between the armature and the first valve portion.

18. The apparatus of claim 17, wherein the valve assembly further comprises at least one upper exit aperture formed as part of the armature, the apparatus defining a fluid flow path through the apparatus which passes through the upper exit aperture, around the outside of the tube, around the first valve member and through the second valve member before exiting the valve portion, without passing through the tube.

* * * * *

Disclaimer

9,702,476 B2 — Robert Wayne McFarland, Newport News, VA (US). SEALED ARMATURE BALL TUBE ASSEMBLY. Patent dated July 11, 2017. Disclaimer filed June 19, 2017, by the assignee, Continental Automotive Systems, Inc.

Hereby disclaims the term of this patent which would extend beyond Patent No. 9,366,355.

*(Official Gazette, August 15, 2017)*